(12) United States Patent
Kurt et al.

(10) Patent No.: US 6,954,257 B2
(45) Date of Patent: Oct. 11, 2005

(54) LITHOGRAPHIC APPARATUS AND DEVICE MANUFACTURING METHOD

(75) Inventors: Ralph Kurt, Eindhoven (NL); Andrei Evgenuevich Iakchine Yakshin, Nieuwegein (NL)

(73) Assignees: ASML Netherlands B.V., Veldhoven (NL); Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/647,784

(22) Filed: Aug. 26, 2003

(65) Prior Publication Data

US 2004/0105083 A1 Jun. 3, 2004

(30) Foreign Application Priority Data

Aug. 28, 2002 (EP) ............................................ 02255961

(51) Int. Cl.[7] .............................................. G03B 27/42
(52) U.S. Cl. ............................ 355/67; 355/53; 355/71; 428/141; 428/408; 428/469; 427/162; 427/402; 427/595; 378/84; 250/505.1; 359/350
(58) Field of Search ............................... 355/53, 67–71; 378/84, 35; 359/350, 361; 428/141, 408, 450, 469; 427/162, 402, 595, 216, 336, 248.1; 250/505.1; 430/5

(56) References Cited

U.S. PATENT DOCUMENTS

| 6,396,900 B1 * | 5/2002 | Barbee et al. ................. 378/84 |
| 6,449,086 B1 | 9/2002 | Singh |
| 6,664,554 B2 * | 12/2003 | Klebanoff et al. ....... 250/505.1 |

| 2002/0012797 A1 | 1/2002 | Bijkerk et al. |
| 2003/0008180 A1 * | 1/2003 | Bajt et al. .................... 428/698 |
| 2004/0105145 A1 * | 6/2004 | Myers ......................... 359/350 |

FOREIGN PATENT DOCUMENTS

| EP | 1 065 568 A3 | 1/2001 |
| EP | 1 065 568 A2 | 1/2001 |
| EP | 1 150 139 A2 | 10/2001 |

OTHER PUBLICATIONS

Singh et al., "Capping layers for extreme–ultraviolet multi-layer interference coatings," Optics Letters 26(5):259–261 (2001).

Larruquert, "Sub–quarterwave multilayers with enhanced reflectance at 13.4 and 11.3 nm," Optics Communications 206:259–273 (2002).

Data Accession No. 7309833, Bajt et al., "Improved reflectance and stability of Mo/Si multilayers," The Institutioin of Electrical Engineers, Stevenage, (2001), XP 002219428.

\* cited by examiner

Primary Examiner—D. Rutledge
(74) Attorney, Agent, or Firm—Pillsbury Winthrop Shaw Pittman LLP

(57) ABSTRACT

An optical element of a lithographic projection apparatus includes a Si/Mo multilayer structure, an outer capping layer and an interlayer positioned between the multilayer structure and the outer capping layer. The interlayer has a thickness of between 0.3 and 0.7 times the wavelength of the incident radiation. The interlayer may be C or Mo and has a thickness of between 6.0 and 9.0 nm. The interlayer may include an inner interlayer including Mo next to the multilayer structure and an outer interlayer including C next to the capping layer. The outer interlayer is at least 3.4 nm thick and the capping layer is Ru and at least 2.0 nm thick.

23 Claims, 4 Drawing Sheets

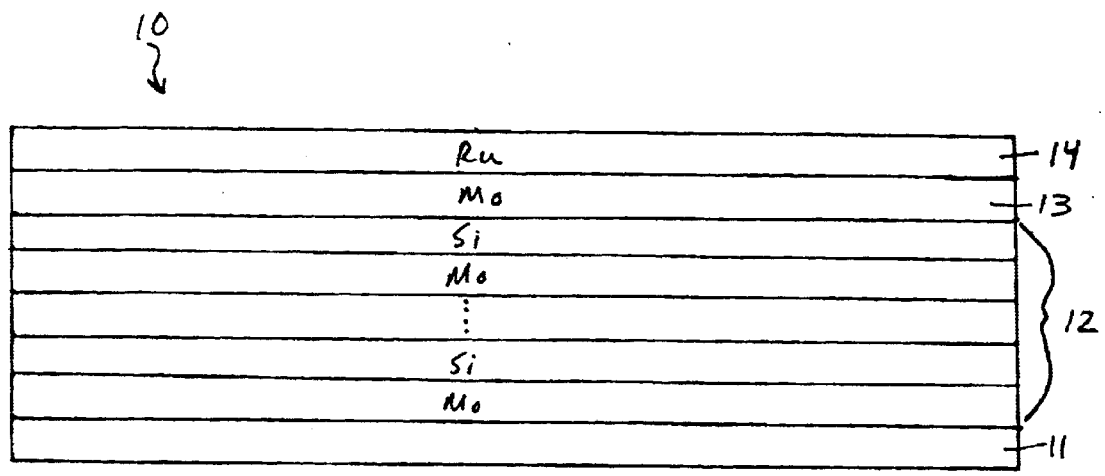
Fig. 2A
Fig. 2B
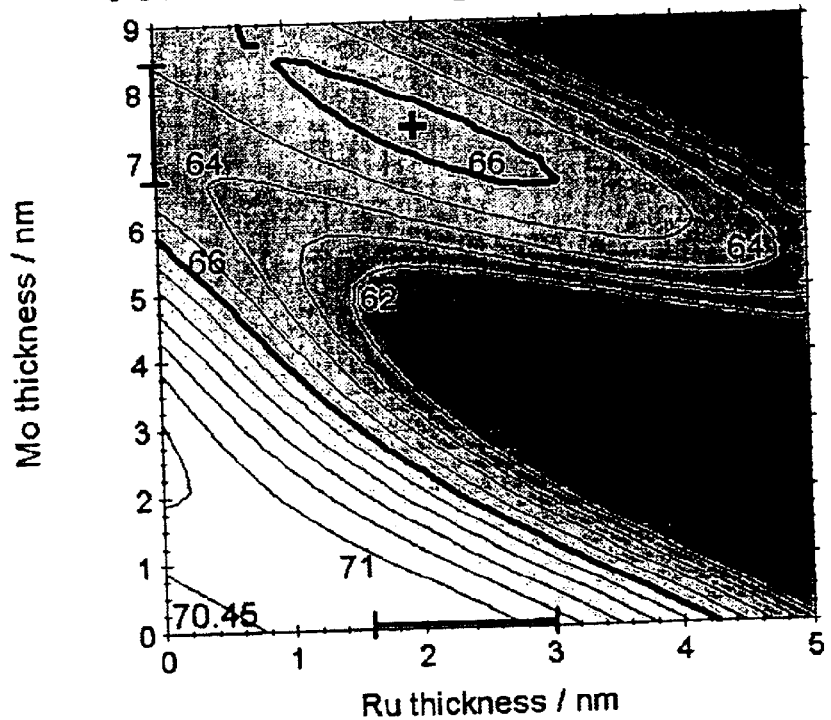

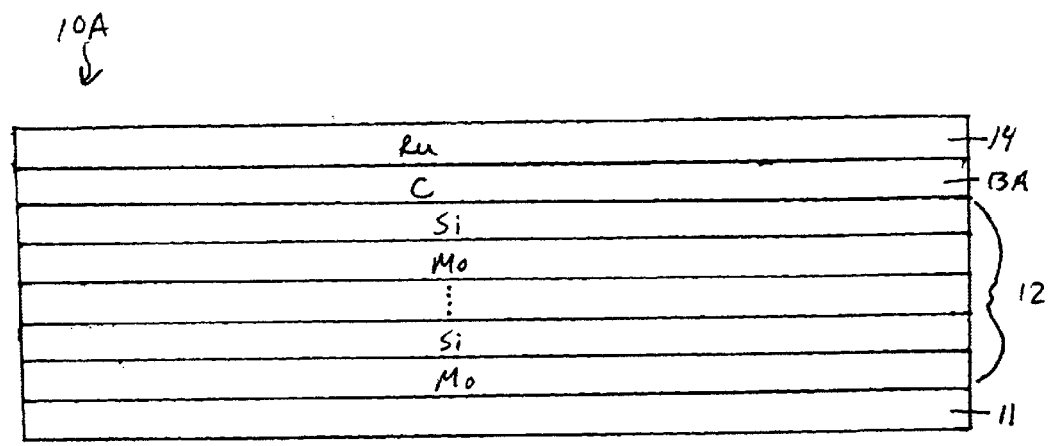
Fig. 3A
Fig. 3B
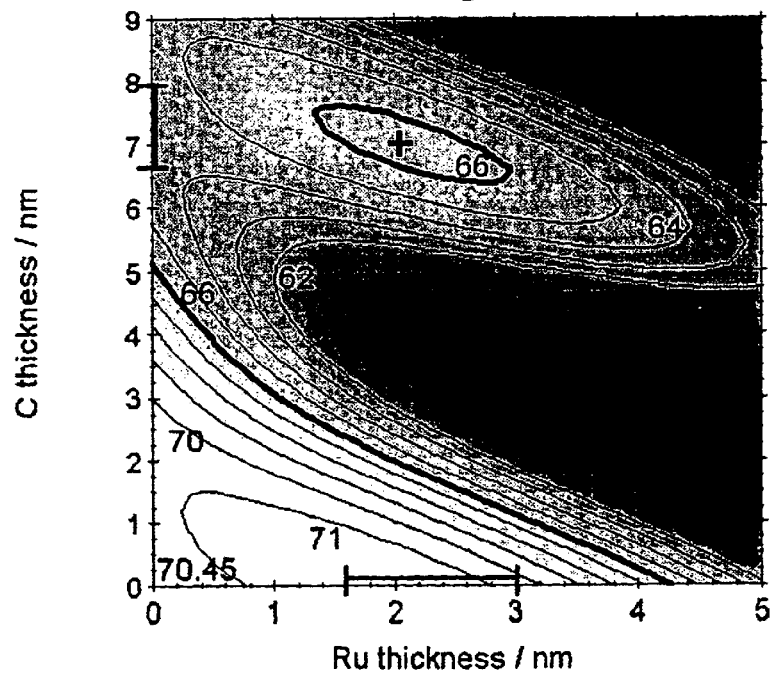

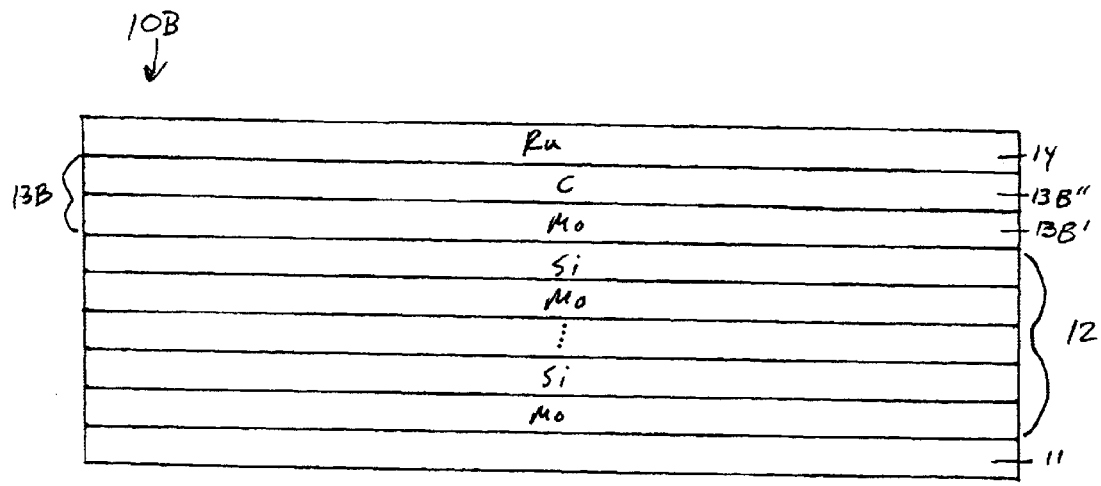
Fig. 4A
Fig. 4B
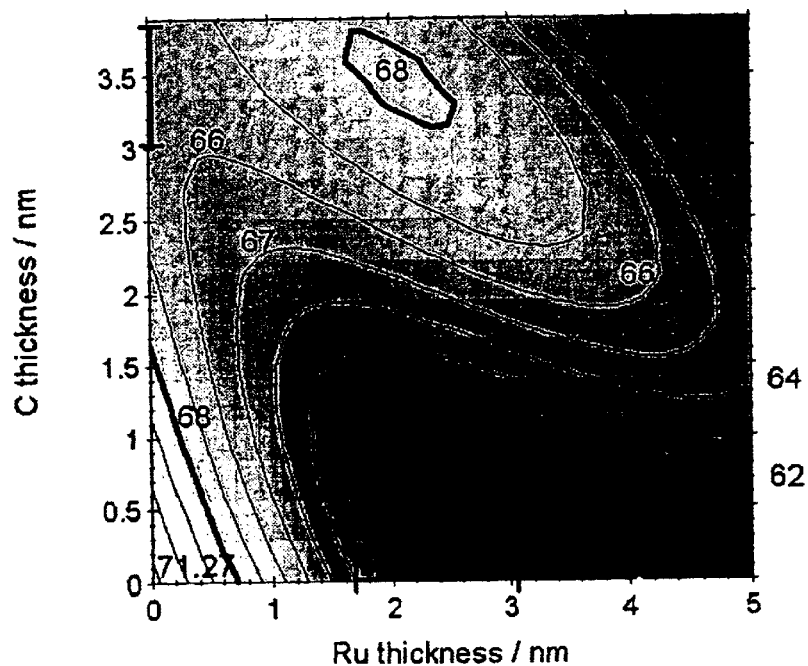

LITHOGRAPHIC APPARATUS AND DEVICE MANUFACTURING METHOD

RELATED APPLICATION

This application claims the benefit of priority to European Patent Application No. 02255961.1, filed Aug. 28, 2002, the contents of which are herein incorporated by reference.

BACKGROUND OF THE INVENTION

1. Field of the Invention

The present invention relates to a lithographic projection apparatus and a device manufacturing method.

2. Description of the Related Art

The term "patterning device" as here employed should be broadly interpreted as referring to device that can be used to endow an incoming radiation beam with a patterned cross-section, corresponding to a pattern that is to be created in a target portion of the substrate. The term "light valve" can also be used in this context. Generally, the pattern will correspond to a particular functional layer in a device being created in the target portion, such as an integrated circuit or other device (see below). An example of such a patterning device is a mask. The concept of a mask is well known in lithography, and it includes mask types such as binary, alternating phase-shift, and attenuated phase-shift, as well as various hybrid mask types. Placement of such a mask in the radiation beam causes selective transmission (in the case of a transmissive mask) or reflection (in the case of a reflective mask) of the radiation impinging on the mask, according to the pattern on the mask. In the case of a mask, the support structure will generally be a mask table, which ensures that the mask can be held at a desired position in the incoming radiation beam, and that it can be moved relative to the beam if so desired.

Another example of a patterning device is a programmable mirror array. One example of such an array is a matrix-addressable surface having a viscoelastic control layer and a reflective surface. The basic principle behind such an apparatus is that, for example, addressed areas of the reflective surface reflect incident light as diffracted light, whereas unaddressed areas reflect incident light as undiffracted light. Using an appropriate filter, the undiffracted light can be filtered out of the reflected beam, leaving only the diffracted light behind. In this manner, the beam becomes patterned according to the addressing pattern of the matrix-addressable surface. An alternative embodiment of a programmable mirror array employs a matrix arrangement of tiny mirrors, each of which can be individually tilted about an axis by applying a suitable localized electric field, or by employing piezoelectric actuators. Once again, the mirrors are matrix-addressable, such that addressed mirrors will reflect an incoming radiation beam in a different direction to unaddressed mirrors. In this manner, the reflected beam is patterned according to the addressing pattern of the matrix-addressable mirrors. The required matrix addressing can be performed using suitable electronics. In both of the situations described hereabove, the patterning device can comprise one or more programmable mirror arrays. More information on mirror arrays as here referred to can be seen, for example, from U.S. Pat. Nos. 5,296,891 and 5,523,193, and WO 98/38597 and WO 98/33096. In the case of a programmable mirror array, the support structure may be embodied as a frame or table, for example, which may be fixed or movable as required.

Another example of a patterning device is a programmable LCD array. An example of such a construction is given in U.S. Pat. No. 5,229,872. As above, the support structure in this case may be embodied as a frame or table, for example, which may be fixed or movable as required.

For purposes of simplicity, the rest of this text may, at certain locations, specifically direct itself to examples involving a mask and mask table. However, the general principles discussed in such instances should be seen in the broader context of the patterning device as hereabove set forth.

Lithographic projection apparatus can be used, for example, in the manufacture of integrated circuits (ICs). In such a case, the patterning device may generate a circuit pattern corresponding to an individual layer of the IC, and this pattern can be imaged onto a target portion (e.g. comprising one or more dies) on a substrate (silicon wafer) that has been coated with a layer of radiation-sensitive material (resist). In general, a single wafer will contain a whole network of adjacent target portions that are successively irradiated via the projection system, one at a time. In current apparatus, employing patterning by a mask on a mask table, a distinction can be made between two different types of machine. In one type of lithographic projection apparatus, each target portion is irradiated by exposing the entire mask pattern onto the target portion at once. Such an apparatus is commonly referred to as a wafer stepper. In an alternative apparatus, commonly referred to as a step-and-scan apparatus, each target portion is irradiated by progressively scanning the mask pattern under the projection beam in a given reference direction (the "scanning" direction) while synchronously scanning the substrate table parallel or anti-parallel to this direction. Since, in general, the projection system will have a magnification factor M (generally <1), the speed V at which the substrate table is scanned will be a factor M times that at which the mask table is scanned. More information with regard to lithographic devices as here described can be seen, for example, from U.S. Pat. No. 6,046,792.

In a known manufacturing process using a lithographic projection apparatus, a pattern (e.g. in a mask) is imaged onto a substrate that is at least partially covered by a layer of radiation-sensitive material (resist). Prior to this imaging, the substrate may undergo various procedures, such as priming, resist coating and a soft bake. After exposure, the substrate may be subjected to other procedures, such as a post-exposure bake (PEB), development, a hard bake and measurement/inspection of the imaged features. This array of procedures is used as a basis to pattern an individual layer of a device, e.g. an IC. Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer. It is important to ensure that the overlay (juxtaposition) of the various stacked layers is as accurate as possible. For this purpose, a small reference mark is provided at one or more positions on the wafer, thus defining the origin of a coordinate system on the wafer. Using optical and electronic devices in combination with the substrate holder positioning device (referred to hereinafter as "alignment system"), this mark can then be relocated each time a new layer has to be juxtaposed on an existing layer, and can be used as an alignment reference. Eventually, an array of devices will be present on the substrate (wafer). These devices are then separated from one another by a technique such as dicing or sawing, whence the individual devices can be mounted on a carrier, connected to pins, etc. Further information regarding such processes can be obtained, for example, from the book "Microchip Fabrication: A Practical Guide to Semiconductor Processing", Third Edition, by Peter van Zant, McGraw Hill Publishing Co., 1997, ISBN 0-07-067250-4.

For the sake of simplicity, the projection system may hereinafter be referred to as the "lens." However, this term should be broadly interpreted as encompassing various types of projection system, including refractive optics, reflective optics, and catadioptric systems, for example. The radiation system may also include components operating according to any of these design types for directing, shaping or controlling the projection beam of radiation, and such components may also be referred to below, collectively or singularly, as a "lens". Further, the lithographic apparatus may be of a type having two or more substrate tables (and/or two or more mask tables). In such "multiple stage" devices the additional tables may be used in parallel or preparatory steps may be carried out on one or more tables while one or more other tables are being used for exposures. Dual stage lithographic apparatus are described, for example, in U.S. Pat. Nos. 5,969,441 and 6,262,796.

Optical elements for use in the extreme ultraviolet (EUV) spectral region, e.g. multilayered thin film reflectors, are especially sensitive to physical and chemical damage which can significantly reduce their reflectivity and optical quality. For example, an unprotected optical element with a Mo/Si multilayer structure is quickly oxidized during EUV radiation in the presence of $10^{-6}$ mbar water, as is to be expected in an unbaked vacuum such as those used for EUV scanners.

Reflectivities of such multilayer optical elements at EUV wavelengths are already low compared to reflectors at longer wavelengths, which is a particular problem because a typical EUV lithographic system may have up to 11 mirrors; four in the illumination optics, six in the imaging optics plus, the reflecting reticle. There may also be a number of grazing incidence mirrors. It is therefore evident that even a "small" decrease in the reflectivity of a single mirror due to oxidation can cause a significant light-throughput reduction in the optical system.

The problem of oxidization of outer layers of multilayer thin film reflectors has already been addressed in U.S. Pat. No. 6,449,086. The problem was addressed by using a relatively inert material, which is resistant to oxidation, as a capping layer on the outer surface of the multilayer structure. In some embodiments, the Si/Mo multilayer structure is covered with other layers before the capping layer to reduce the likelihood of incomplete coverage because of the necessary multiple layer deposition. This multiple layer capping layer has been found to have good short term oxidation resistance.

SUMMARY OF THE INVENTION

It is an aspect of the present invention to provide an optical element which has acceptable reflectivity while exhibiting improved resistance to oxidation over the long term.

This and other aspects are achieved according to the invention in a lithographic apparatus including a radiation system configured to supply a beam of radiation; a support configured to support a patterning device, the patterning device configured to pattern the projection beam according to a desired pattern; a substrate table configured to hold a substrate; a projection system configured to project the patterned beam onto a target portion of the substrate; and at least one optical element on which the projection beam is incident having a Si/Mo multilayer structure, a capping layer and an interlayer positioned between the multilayer structure and the capping layer, wherein the capping layer includes (i) C or Mo or (ii) an inner interlayer including Mo next to the multilayer structure and an outer interlayer including C next to the capping layer wherein (i) the interlayer has a thickness of between 6.0 and 9.0 nm and, in (ii) the outer interlayer has a thickness greater than about 3.4 nm or the capping layer has a thickness greater than about 2.0 nm.

The advantage of such a thick interlayer is that the resistance to chemical attack, and in particular oxidation of the optical element, is increased over the thinner interlayer thicknesses of between 1 and 2 nm previously used. Surprisingly, this increase in oxidation resistance is not accompanied by a significant decrease in reflectivity, which would be disadvantageous. The thickness of interlayer of the present invention lies in the region of a second peak of reflectivity which was previously not known to exist. The presence of the interlayer itself ensures that the capping layer material does not intermix with the outer layer of the multilayer structure (the outer layer of which is usually Si).

According to a further aspect of the invention there is provided a device manufacturing method including providing a patterned beam of radiation; projecting the patterned beam of radiation onto a target portion of a layer of radiation-sensitive material at least partially covering a substrate using at least one optical element on which the projection beam is incident, wherein the at least one optical element has a Si/Mo multilayer structure, an outer capping layer and an interlayer including C or Mo positioned between the multilayer structure and the outer capping layer, the interlayer has a thickness of between 6.0 and 9.0 nm or the interlayer includes an inner interlayer including Mo next to the multilayer structure and an outer interlayer including C next to the capping layer, the outer interlayer of C has a thickness greater than about 3.4 nm or the capping layer has a thickness greater than about 2.0 nm.

Although specific reference may be made in this text to the use of the apparatus according to the invention in the manufacture of ICs, it should be explicitly understood that such an apparatus has many other possible applications. For example, it may be employed in the manufacture of integrated optical systems, guidance and detection patterns for magnetic domain memories, liquid-crystal display panels, thin-film magnetic heads, etc. one of ordinary skill in the art will appreciate that, in the context of such alternative applications, any use of the terms "reticle", "wafer" or "die" in this text should be considered as being replaced by the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5–20 nm, particularly 13.5 nm), as well as particle beams, such as ion beams or electron beams.

BRIEF DESCRIPTION OF THE DRAWINGS

Embodiments of the present invention will now be described, by way of example only, with reference to the accompanying schematic drawings in which:

FIG. 2A is a schematic illustration of an optical element according to a first embodiment of the present invention;

FIG. 2B is a contour map of reflectivity as a function of Mo interlayer thickness versus Ru capping layer thickness for an optical element of the first embodiment of the present invention;

FIG. 3A is a schematic illustration of an optical element according to a second embodiment;

FIG. 3B is a contour map of reflectivity as a function of C interlayer thickness versus Ru capping layer thickness for an optical element according to the second embodiment of the present invention; and FIG. 4A is a schematic illustration of an optical element according to a third embodiment;

FIG. 4 is a contour map of reflectivity as a function of C outer interlayer thickness versus Ru capping layer thickness for an optical element according to the third embodiment of the present invention.

In the Figures, corresponding reference symbols indicate corresponding parts.

DETAILED DESCRIPTION

Figure 1:
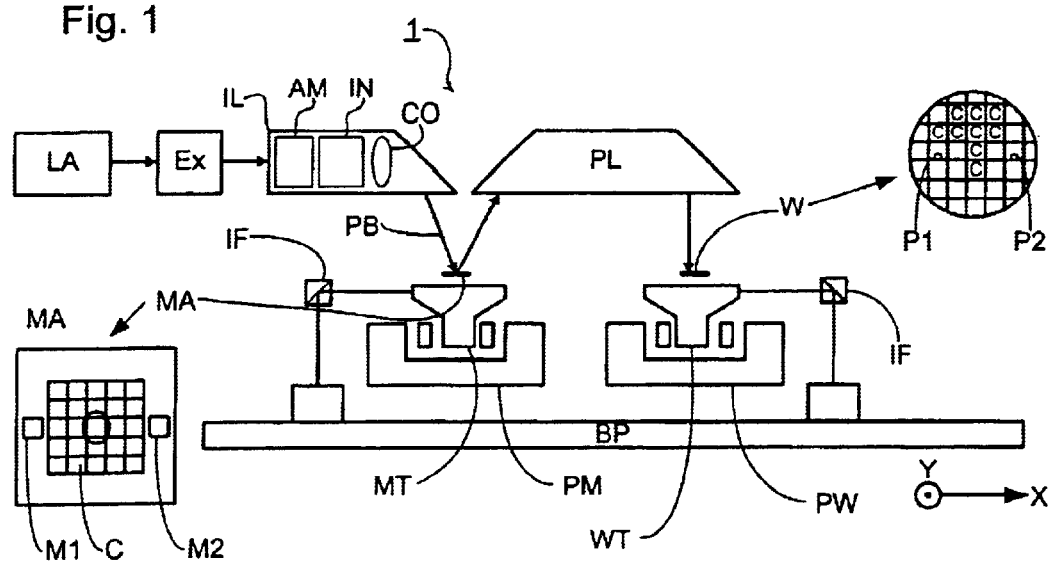
FIG. 1 depicts a lithographic projection apparatus according to an embodiment of the present invention.

FIG. 1 schematically depicts a lithographic projection apparatus 1 according to an embodiment of the invention. The apparatus 1 includes a base plate BP. The apparatus may also include a radiation source LA (e.g. UV or EUV radiation, such as, for example, generated by an excimer laser operating at a wavelength of 248 nm, 193 nm or 157 nm, or by a laser-fired plasma source operating at 13.6 nm). A first object (mask) table MT is provided with a mask holder configured to hold a mask MA (e.g. a reticle), and is connected to a first positioning device PM that accurately positions the mask with respect to a projection system or lens PL. A second object (substrate) table WT is provided with a substrate holder configured to hold a substrate W (e.g. a resist-coated silicon wafer), and is connected to a second positioning device PW that accurately positions the substrate with respect to the projection system PL. The projection system or lens PL (e.g. a mirror group) is configured to image an irradiated portion of the mask MA onto a target portion C (e.g. comprising one or more dies) of the substrate W.

As here depicted, the apparatus is of a reflective type (i.e. has a reflective mask). However, in general, it may also be of a transmissive type, for example with a transmissive mask. Alternatively, the apparatus may employ another kind of patterning device, such as a programmable mirror array of a type as referred to above.

The source LA (e.g. a discharge or laser-produced plasma source) produces radiation. This radiation is fed into an illumination system (illuminator) IL, either directly or after having traversed a conditioning device, such as a beam expander Ex, for example. The illuminator IL may comprise an adjusting device AM configured to set the outer and/or inner radial extent (commonly referred to as σ-outer and σ-inner, respectively) of the intensity distribution in the beam PB. In addition, it will generally comprise various other components, such as an integrator IN and a condenser CO. In this way, the beam PB impinging on the mask MA has a desired uniformity and intensity distribution in its cross-section.

It should be noted with regard to FIG. 1 that the source LA may be within the housing of the lithographic projection apparatus, as is often the case when the source LA is a mercury lamp, for example, but that it may also be remote from the lithographic projection apparatus, the radiation which it produces being led into the apparatus (e.g. with the aid of suitable directing mirrors). This latter scenario is often the case when the source LA is an excimer laser. The present invention encompasses both of these scenarios.

The beam PB subsequently intercepts the mask MA, which is held on a mask table MT. Having traversed the mask MA, the beam PB passes through the lens PL, which focuses the beam PB onto a target portion C of the substrate W. With the aid of the second positioning device PW and interferometer(s) IF, the substrate table WT can be moved accurately, e.g. so as to position different target portions C in the path of the beam PB. Similarly, the first positioning device PM can be used to accurately position the mask MA with respect to the path of the beam PB, e.g. after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 1. However, in the case of a wafer stepper (as opposed to a step and scan apparatus) the mask table MT may just be connected to a short stroke actuator, or may be fixed. The mask MA and the substrate W may be aligned using mask alignment marks $M_1$, $M_2$ and substrate alignment marks $P_1$, $P_2$.

1. The depicted apparatus can be used in two different modes: In step mode, the mask table MT is kept essentially stationary, and an entire mask image is projected at once, i.e. a single "flash," onto a target portion C. The substrate table WT is then shifted in the X and/or Y directions so that a different target portion C can be irradiated by the beam PB;

2. In scan mode, essentially the same scenario applies, except that a given target portion C is not exposed in a single "flash." Instead, the mask table MT is movable in a given direction (the so-called "scan direction", e.g., the Y direction) with a speed v, so that the beam PB is caused to scan over a mask image. Concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

The examples of present the invention described below are obtained from computations performed using a thin film design program based on standard optical principles. The optical constants of the various materials, namely the complex refractive index N=n−ik are derived from atomic scattering factors by Henke et. al. and were obtained from the CXRO web server at Berkeley (B. L. Henke, E. M. Gullikson, and J. C. Davis, Atomic Data and Nuclear Data Tables, 54(2), 181–342 (1993); http://www.cxro.lbl.gov/optical-constants/). The calculations were performed at 13.5 nm and the values of n and k for the materials used were downloaded as functions of wavelength at 13.5 nm.

The results of the simulations calculating the theoretical reflectivity of various optical elements are performed using a projection beam wavelength of 13.5 nm but not taking account of surface roughness or interfacial diffusion. The invention is suitable for other wavelengths, especially in the EUV range of from 6 nm to 42 nm.

Referring to FIGS. 2A and 2B, FIG. 2B shows the results of simulations calculating the theoretical reflectivity of a normal incidence optical element 10 which has a multilayer structure 12 comprising 40 periods of Si/Mo layers grown on a substrate 11 of, for example, Si. In practice ZERODUR (TM) or other low coefficient of thermal expansion materials such as ULE (TM) are used as the substrate 11 and 40 to 50 periods of Si/Mo are used as the multilayer structure 12. In the example given, the Si layers are 3.36 nm thick and the Mo layers are 3.66 nm thick, though other thicknesses may be used. Placed on the outer side of the optical element 10, i.e. on the other side of the multilayer structure 12 to the substrate 11, is a capping layer 14, for example, of Ru. The capping layer 14 of Ru is intended to prevent oxidation of the multilayer structure 12 over long time periods. In order to avoid intermixing of the Ru capping layer 14 and the outer layer of Si of the multilayer structure 12, an interlayer 13 of Mo is positioned between the multilayer structure 12 and the capping layer 14.

It is desired to maintain the high reflectivity of the optical element and so previously only thin interlayers have been used. It was thought that the trend in reduction in reflectivity with an increase in thickness of Mo interlayer observed at thicknesses in the range of 1.0 to 2.5 nm continued at higher thicknesses. However, referring to FIG. 2B, it can be seen that a second peak in the reflectivity occurs for Mo interlayer thicknesses between 6.0 to 9.0 nm.

Although the reflectivity at such thicknesses of the interlayer is lower than that for thinner interlayers, this reduction in reflectivity can be tolerated because of the improvements in oxidation resistance which are achieved by a provision of a Mo interlayer of such a thickness.

As can be seen from FIG. 2B, the peak reflectivity occurs for a capping layer comprised of Ru of a thickness between 1.0 to 3.0 nm, in particular 1.6 to 3.0 nm, and (in particular for lower thicknesses of the interlayer) between 2.0 and 3.0 nm. The best reflectivities are given for an interlayer of Mo of between 6.8 and 8.5 nm, and even better reflectivities are experienced with layers of between 7.2 and 8.0 nm.

Referring to FIGS. 3A and 3B, FIG. 3B shows the results of simulations calculating the theoretical reflectivity of a normal incidence optical element 10A according to the second embodiment. The optical element 10A of the second embodiment has the same structure as that of the first embodiment except that the interlayer 13A is C instead of Mo.

As with the first embodiment, a second peak in reflectivity is apparent from FIG. 3B in the case where the interlayer 13A has a thickness of between 6.0 and 9.0 nm. The highest reflectivity is seen between 6.5 and 8.2 nm and more particularly between 7.0 and 7.8 nm. For the capping layer of Ru, the best reflectivity is between 1.6 and 3.0 nm.

For a larger thickness of the interlayer, a lower thickness of the capping layer is desirable, for example as low as 1.0 nm. For a lower thickness of the interlayer 13A of C a larger thickness of Ru capping layer 14 is desirable, up to about 3.0 nm. Preferably the Ru capping layer 14 has a thickness of between 1.6 and 3.0 nm, more preferably at least 2.0 nm.

Referring to FIGS. 4A and 4B, FIG. 4B shows the results of simulations calculating the theoretical reflectivity of a normal incidence optical element 10B according to the third embodiment of the present invention. The structure of the optical element 10B of the third embodiment of the present invention is the same as that of the first embodiment of the present invention except that the interlayer 13B includes an inner interlayer 13B' of Mo, which is positioned next to the multilayer structure 12, and an outer interlayer 13B" of C which is positioned next to the Ru capping layer 14. The results of the simulations in FIG. 4B are for an inner interlayer thickness of Mo of 3.36 nm.

The results in FIG. 4B show a second peak of reflectivity in the same way that the results in FIGS. 2B and 3B also show a second peak in reflectivity. The second peak in reflectivity in the third embodiment occurs with an outer interlayer of C with a thickness of between 3.0 to 4.0 nm, for a capping layer of Ru with a thickness greater than about 2.0 nm, more preferably 2.2, and most preferably greater than about 2.4 nm. For a capping layer of Ru with a thickness of between 1.6 and 3.0, the best reflectivity is achieved with an outer interlayer of C of at least 3.4 nm, preferably greater than about 3.5 nm and most preferably greater than about 3.7 nm.

As can be seen from the examples, the second peak in reflectivity occurs when the interlayer thickness, i.e. the thickness of those layers positioned between the outermost Si layer in the Si/Mo multilayer structure and the capping layer, is about half the wavelength of the incident radiation, between 0.3 and 0.7, or between 0.4 and 0.6, preferably between 0.45 and 0.55, times the wavelength of the incident radiation.

Although only Mo—C, C and Mo interlayers have been given as examples, the invention is not limited to these. The interlayer may be such materials as, for example, Mo—C, C, Mo, $B_4C$, $Mo_2C$, Mo(Cr), $B_4C$—C—$B_4C$, etc.

The capping layer may be of such materials as, for example, Ru, Rh, B, $SiO_2$, Pd, $Si_3N_4$, SiC, BN, $B_4C$, BeO, $B_4C$, etc.

Another advantage of the present invention is that the thickness of the capping layer is less critical and so less control is required when applying that capping layer.

While specific embodiments of the invention have been described above, it will be appreciated that the invention may be practiced otherwise than as described. The description is not intended to limit the invention.

What is claimed is:

1. A lithographic projection apparatus, comprising:
   a radiation system configured to provide a beam of radiation;
   a support configured to support patterning device, the patterning device configured to pattern to beam of radiation according to a desired pattern;
   a substrate table configured to hold a substrate;
   a projection system configured to project the patterned beam onto a target portion of the substrate; and
   at least one optical element on which the beam of radiation is incident having a Si/Mo multilayer structure, a capping layer, and an interlayer comprising C or Mo positioned between the multilayer structure and the capping layer, wherein the interlayer has a thickness of greater than 7.0 and up to 9.0 nm.

2. A lithographic projection apparatus according to claim 1, wherein the interlayer thickness is greater than 7.0 and up to 8.5 nm.

3. A lithographic projection apparatus according to claim 1, wherein the interlayer thickness is greater than 7.0 and up to 8.0 nm.

4. A lithographic projection apparatus according to claim 1, wherein the interlayer comprises Mo and has a thickness greater than 7.0 and up to 8.5 nm.

5. A lithographic projection apparatus according to claim 1, wherein the interlayer comprises Mo and has a thickness of between 7.2 and 8.0 nm.

6. A lithographic projection apparatus according to claim 1, wherein the interlayer comprises C and has a thickness greater than 7.0 and up to 8.2 nm.

7. A lithographic projection apparatus according to claim 1, wherein the interlayer comprises C and has a thickness greater than 7.0 and up to 7.8 nm.

8. A lithographic projection apparatus according to claim 1, wherein the capping layer comprises Ru and has a thickness of between 1.0 and 3.0 nm.

9. A lithographic projection apparatus according to claim 1, wherein the capping layer comprises Ru and has a thickness of between 1.6 and 3.0 nm.

10. A lithographic projection apparatus according to claim 1, wherein the capping layer comprises Ru and has a thickness of at least 2.0 nm.

11. A lithographic projection apparatus according to claim 1, wherein the capping layer comprises Ru and has a thickness of at least 2.2 nm.

12. A lithographic projection apparatus, comprising:
a radiation system configured to provide a beam of radiation;
a support configured to support a patterning device, the patterning device configured to pattern the beam according to a desired pattern;
a substrate table configured to hold a substrate;
a projection system configured to project the patterned beam onto a target portion of the subtract; and
at least one optical element on which the beam of radiation is incident having a Si/Mo multilayer structure, a capping layer, and an interlayer positioned between the multilayer structure and the capping layer, wherein the interlayer comprises an inner interlayer comprising Mo next to the multilayer structure and an outer interlayer comprising C next to the capping layer, the outer interlayer C has a thickness greater than 3.4 nm or the capping layer has a thickness greater than 2.0 nm and the combined thickness of the inner and outer interlayers greater than 7.0 and up to 9.0 nm.

13. A lithographic projection apparatus according to claim 12, wherein the outer interlayer has a thickness greater than 3.5 nm.

14. A lithographic projection apparatus according to claim 12, wherein the outer interlayer has a thickness greater than 3.7 nm.

15. A lithographic projection apparatus according to claim 12, wherein the outer interlayer has a thickness of less than 3.8 nm.

16. A lithographic projection apparatus according to claim 12, wherein the outer interlayer has a thickness of less than 3.4 nm.

17. A lithographic projection apparatus according to claim 12, wherein the capping layer has a thickness greater than 2.1 nm.

18. A lithographic projection apparatus according to claim 12, wherein the capping layer has a thickness greater than 2.2 nm.

19. A lithographic projection apparatus according to claim 12, wherein the inner interlayer has a thickness of between 3.0 and 4.0 nm.

20. A lithographic projection apparatus according to claim 12, wherein the inner interlayer has a thickness of 3.75 nm.

21. A device manufacturing method, comprising:
providing a beam of radiation;
patterning the beam in its cross section;
projecting the beam of radiation after it is patterned onto a target portion of a layer of radiation-sensitive material at least partially covering a substrate using at least one optical element on which the beam of radiation is incident, wherein the at least one optical element has a Si/Mo multilayer structure, a capping layer, and an interlayer comprising C or Mo positioned between the multilayer structure and the capping layer, the interlayer has a thickness greater than 7.0 and up to 9.0 nm.

22. A device manufacturing method, comprising:
providing a beam of radiation;
patterning the beam in its cross section;
projecting the beam of radiation after it is patterned onto a target portion of a layer of radiation-sensitive material at least partially covering a substrate using at least one optical element on which the beam of radiation is incident, wherein the at least one optical element has a Si/Mo multilayer structure, an outer capping layer, and an interlayer positioned between the multilayer structure and the outer capping layer, the interlayer comprises an inner interlayer comprising Mo next to the multilayer structure and an outer interlayer comprising C next to the capping layer, the outer interlayer has a thickness greater than 3.4 nm or the capping layer has a thickness greater than 2.0 nm and the combined thickness of the inner and outer interlayers greater than 7.0 and up to 9.0 nm.

23. An optical element for use in a lithographic projection apparatus, the optical element comprising:
a Si/MO multilayer structure;
a capping layer; and
an interlayer positioned between the multilayer structure and the capping layer, wherein the interlayer comprises one of:
a layer comprising C or Mo, the layer having a thickness greater than 3.5 nm, and up to 9.0 nm; and
an inner interlayer comprising Mo next to the multilayer structure and an outer interlayer comprising C next to the capping layer, the outer interlayer having a thickness greater than 3.4 nm or the capping layer having a thickness greater than 2.0 nm and the combined thickness of the inner and outer interlayers greater than 7.0 and up to 9.0 nm.

* * * * *